United States Patent
Friedl

(10) Patent No.: US 8,713,800 B2
(45) Date of Patent: May 6, 2014

(54) ASSEMBLY JIG FOR RADIAL CYLINDER ROLLER BEARING

(75) Inventor: Wolfgang Friedl, Steyr (AT)

(73) Assignee: Aktiebolaget SKF, Gothenburg (SE)

( * ) Notice: Subject to any disclaimer, the term of this patent is extended or adjusted under 35 U.S.C. 154(b) by 683 days.

(21) Appl. No.: 12/995,012

(22) PCT Filed: May 20, 2009

(86) PCT No.: PCT/EP2009/003603
§ 371 (c)(1),
(2), (4) Date: Mar. 15, 2011

(87) PCT Pub. No.: WO2009/146799
PCT Pub. Date: Dec. 10, 2009

(65) Prior Publication Data
US 2011/0154666 A1   Jun. 30, 2011

(30) Foreign Application Priority Data

May 30, 2008   (DE) .......................... 10 2008 026 250

(51) Int. Cl.
*F16C 43/06*   (2006.01)

(52) U.S. Cl.
USPC .. 29/898.09; 29/724; 29/898.07; 29/898.062; 269/43; 269/40

(58) Field of Classification Search
CPC .......... B21D 53/10; B23P 17/00; B21K 1/76; B25B 27/14; F16C 43/06
USPC .................. 29/724, 898.09, 898.07, 898.062; 269/43, 40
See application file for complete search history.

(56) References Cited

U.S. PATENT DOCUMENTS

| 1,419,520 | A |   | 6/1922  | Rockwell |
| 3,256,585 | A | * | 6/1966  | Ripple ...................... 29/898.067 |
| 3,696,490 | A | * | 10/1972 | Secunda ....................... 269/156 |
| 7,721,419 | B2 | * | 5/2010  | Leimann ........................ 29/724 |
| 8,393,066 | B2 | * | 3/2013  | Montesanti et al. ....... 29/407.04 |

FOREIGN PATENT DOCUMENTS

| DE | 8018779 U1 | 10/1980 |
| DE | 102007013934 A1 | 9/2008 |
| GB | 2377974 A | 1/2003 |
| JP | 2005188590 A | 7/2005 |

* cited by examiner

*Primary Examiner* — David Bryant
*Assistant Examiner* — Jason L Vaughn
(74) *Attorney, Agent, or Firm* — Bryan Peckjian; SKF USA Inc. Patent Department

(57) ABSTRACT

An assembly jig for a radial roller bearing comprises a retaining structure having a plurality of axially-projecting projections configured to retain a plurality of roller bodies disposed in a ring-shape during a bearing assembly process. The roller bodies are supportable in a first radial direction on a first component and each roller body contacts two adjacent projections in a second radial direction, which is opposite of the first radial direction. The projections are configured to press the roller bodies against the first component and such that a portion of the roller bodies projects past the projections in the second radial direction. The assembly jig is removable from the roller bearing in the axial direction after final assembly of the roller bearing.

18 Claims, 1 Drawing Sheet

ASSEMBLY JIG FOR RADIAL CYLINDER ROLLER BEARING

CROSS-REFERENCE

This application is the U.S. national stage of International Application No. PCT/EP2009/003603 filed on May 20, 2009, which claims priority to German patent application no. 10 2008 026 250.1 filed on May 30, 2008.

TECHNICAL FIELD

The present invention relates to an assembly jig for a radial cylindrical or tapered roller bearing.

RELATED ART

It is known in the prior art to use an assembly jig for assembling roller bearings. If, for example, roller bodies are inserted into openings of a roller bearing cage that does not itself retain the roller bodies on both sides, an annular assembly jig is used to prevent the roller bodies from falling out of the openings; the outer diameter of the assembly jig corresponds to an inner envelope of roller bodies inserted into the roller bearing cage, or the inner radius of the assembly jig corresponds to an outer envelope of the roller bodies, depending on whether the roller bodies are inserted into the roller body cage from the radial outside or the radial inside. The ring of roller bodies secured in the roller body cage in this manner is then inserted into an outer ring of the roller bearing or is pushed onto an inner ring of the roller bearing.

When pushing the row of roller bodies onto or into the track of the roller bearing, one axial end side of the annular assembly jig comes into abutment with the axial end side of the inner ring or the outer ring and the roller bearing parts retained by the assembly jig are pushed, so that the inner ring or the outer ring replaces the assembly jig. A radius of the assembly jig thus corresponds, in particular, to the radius of the inner or outer track of the roller bearing; the roller bodies are secured in a captive manner by the track after the removal of the assembly jig.

The preceding description also applies to roller body cages, in which the roller bodies are snap-fit in a captive manner in the pockets of the cage; however, the play of the roller bodies in the pockets is large such that, during the described pushing of the roller set onto or into the corresponding track element, the danger would arise for at least one part of the roller body that its end sides will contact the end side of the track element during the pushing due the clearance in the cage and thus the end sides will be tilted.

The preceding description thus applies to, among others, cylindrical roller bearings of the design variants N and NU. In the design variant N, the roller body set is retained by the assembly jig towards the inside on the inner track and, in the design variant NU, the roller body set is retained by the assembly jig radially outwardly on the outer track, in order to facilitate the inserting of the roller bodies or cylindrical rollers onto or into the bearing ring, which is already mounted in the housing or on the shaft.

SUMMARY

In one aspect of the present teachings, roller bodies are prevented from tilting while being pushed onto or into a pre-mounted bearing ring.

Another aspect of the present teachings relates to an assembly jig having a retaining structure for retaining roller bodies of a roller bearing during a bearing assembly process. For this purpose, the roller bodies are supported on a first component in a first radial direction and on the retaining structure in a second direction, which is opposite of the first radial direction.

The first component can be a roller bearing cage and/or one of the track elements of the roller bearing, wherein the track element can be, e.g., a roller bearing ring having flanges.

It is proposed that the retaining structure comprises a plurality of axially-projecting projections that engage in the respective intervening spaces between each two roller bodies. The projections of the retaining structure lie completely within a rolling radius of the roller body in the second radial direction. In this context, the term "within" refers to the position of the roller bodies. Due to the projections being disposed in the intervening space between the roller bodies, the assembly jig can also securely retain the roller bodies during the insertion of the roller bodies onto the inner ring or into the outer ring, so that a tilting of the roller bodies can be avoided during the insertion process. It is therefore possible to remove the assembly jig when the roller bodies have reached the appropriate axial portion within the corresponding track. The assembly jig is proposed for a (radial-) cylindrical roller bearing, but can of course also be used in the assembly of tapered roller bearings having at least one circular-cylindrical-shaped rolling surface.

If the second radial direction, in which the retaining structure retains the roller bodies, is directed radially-outward, the axially-projecting projections can be easily pushed into the radially-widening intervening space between two roller bodies. A secure retention of the roller bodies can be achieved if the axially-projecting projections each comprise two concave abutment surfaces for abutting on the roller bodies that form the intervening space; the radius of curvature of the axially-projecting projections can correspond, in particular, to the radius of curvature of the rolling surfaces of the roller bodies.

Manipulation of the assembly jig is simplified if the axially-projecting projections are disposed on one axial end side of the retaining ring, wherein this retaining ring can be pushed, e.g., onto an axle having a pre-mounted inner ring.

The assembly jig can assist the installer in the selection of the final assembled position of the bearing ring if the retaining ring comprises an abutment collar projecting in the direction opposite of the second radial direction. In this case, the abutment collar can abut, e.g., on a housing or on a shaft having a pre-mounted bearing ring and can thus stipulate the assembly position of the bearing ring in the axial direction.

Further, it is proposed that the retaining ring comprises a means for manipulating the assembly jig. Such a means can be, e.g., a bow handle or a hole for screw-fastening in a handle, wherein the hole is preferably widened in the portion of the abutment collar, in order to countersink a threaded nut.

Further, the invention relates to a method for assembling a roller bearing. The method comprises the securing of the roller bodies by a retaining structure of a retaining element, so that the roller bodies are supported on a first component in a first radial direction and are supported on the retaining structure in a second radial direction, and pushing the roller bodies onto a track of the roller bearing that is directed in the second radial direction, as well as the removal of the assembly jig.

In order to avoid a tilting of the roller bodies during the pushing-on, it is proposed that the retaining structure comprises a plurality of axially-projecting projections that are each pushed into an intervening space between two roller bodies when securing the roller bodies, and the projections overlap with the track in an axial direction when pushing-on the roller bodies.

Further advantages can be derived from the following description of the drawings. The Figures, the description and the patent claims contain numerous features in combination. The skilled person will consider the features individually as well as in further useful combinations.

DETAILED DESCRIPTION OF THE INVENTION

Figure 1:
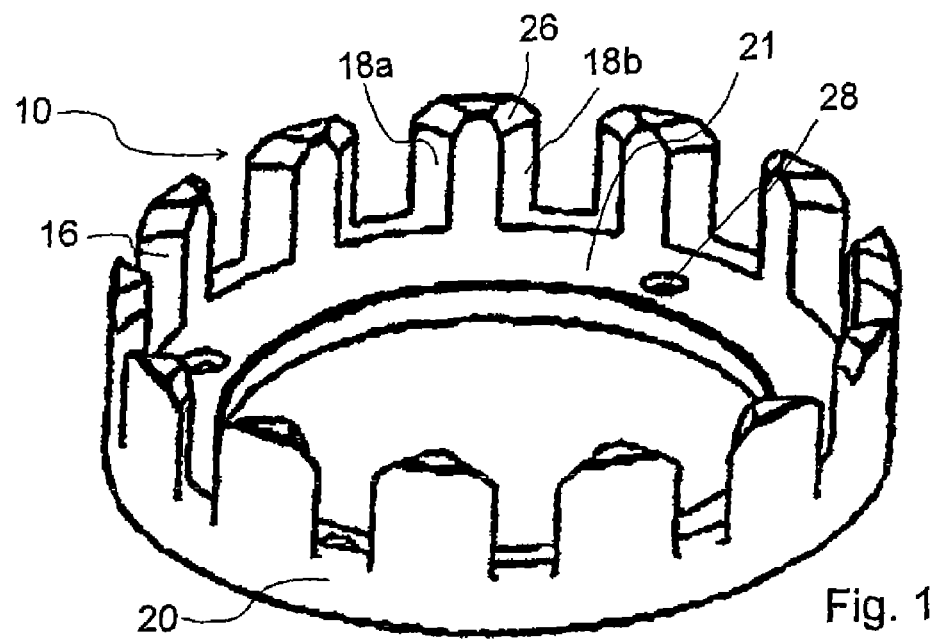
FIG. 1 shows, in a perspective view, an assembly jig having a retaining structure for retaining roller bodies during an assembly process

FIG. 1 shows an assembly jig having a retaining ring 20; axially-projecting projections 16 are formed on an axial end side of the assembly jig and are distributed in an approximately isotropic manner around the circumference of the retaining ring 20. The axially-projecting projections 16 form a retaining structure for retaining a set of roller bodies 12 of a roller bearing. The retaining structure 10 secures the roller bodies 12 and radially inwardly biases the roller bodies 12, which are inserted into openings in the roller body cage 14. Thus, during the assembly process, the roller bodies 12 are supported on the bearing inner ring 24 in a first, inwardly-oriented radial direction R1 and are supported on the retaining structure 10 of the assembly jig in a second, outwardly-oriented, radial direction R. Thus, the assembly jig can also be simultaneously used as a transport retainer for the unit comprised of the bearing inner ring 24, roller bodies 12 and roller body cage 14, and in particular when the roller bearing cage 14 does not prevent the roller bodies 12 from falling out in the radially-outward direction.

The axially-projecting projections 16 of the retaining structure 10 of the assembly jig are configured so that they can each engage in an intervening space between two roller bodies 12 during the assembly process and such that the roller bodies 12 project beyond an annular outer envelope, which the projections surround, in the second radial direction R2, i.e. outwardly. The retaining structure 10 according to FIG. 1 is configured for retaining roller bodies 12 formed as cylindrical rollers.

Apart from a chamfer 26 on the axially outer end of the projection 16, which chamfer 26 facilitates the insertion of the projections 16 into the intervening space between the roller bodies 12, the side surfaces of the projections 16 extend in parallel to the symmetry axis of the retaining ring 20. The radially-inner and radially-outer side surfaces of the projections 16 are curved concentrically to the symmetry axis of the retaining ring 20, whereas side surfaces of the projections 16 in the circumferential direction are formed by two concave abutment surfaces 18a, 18b; the abutment surfaces 18a, 18b are configured for abutment on the roller bodies 12 defining the intervening space. The abutment surfaces 18a, 18b have the shape of a segment of a cylindrical shell and their curvature corresponds to the curvature of the rolling surfaces of the roller bodies 12; the abutment surfaces 18a, 18b secure the roller bodies 12 during the assembly.

The assembly jig comprises an abutment collar 21, which projects from the retaining ring 20 in the first radial direction R1, i.e. radially-inwardly, for abutting on the end side of the cylindrical rollers or on one side ring of the roller body cage 14. Four axially-extending bores 28 are formed in the abutment collar 21. An end of the bores 28 facing towards the projections 16 is widened for accommodating countersunk bolts. The four bores 28 can be used for attaching a means for manipulating the assembly jig formed as a bow handle 22 and thus itself forms a means for manipulating the assembly jig.

Figure 2:
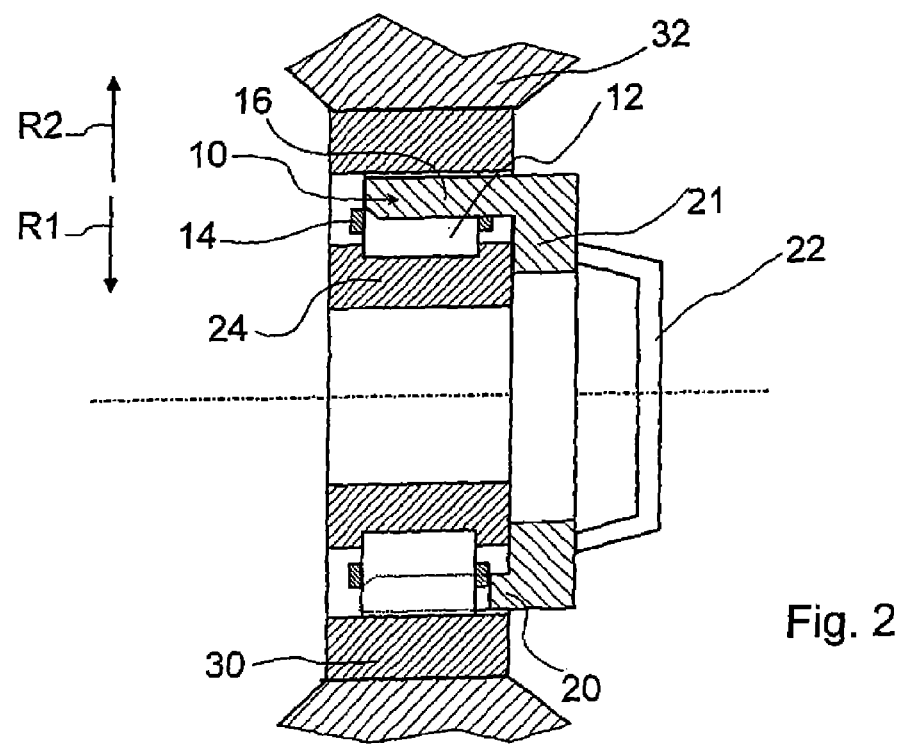
FIG. 2 shows the use of the assembly jig of FIG. 1 during an assembly process.

FIG. 2 illustrates the use of the assembly jig of FIG. 1 for assembling a roller bearing of the design variant N formed as a cylindrical roller bearing. A row of roller bodies 12 is pre-assembled together with a roller body cage 14 on a bearing inner ring 24. The projections 16 respectively penetrate into the intervening spaces between two roller bodies 12 and press the roller bodies 12 radially inward in a manner of speaking. The roller bodies 12 protrude through intervening spaces between the projections 16 and radially beyond the projections 16. A bearing outer ring 30 is pre-mounted in a housing 32. The installer can insert the entire structure, which is formed of the bearing inner ring 24, the roller bodies 12, the roller body cage 14 and the assembly jig, into the housing 32 using the bow handle 22 attached via the means; thus, the roller bodies 12 are inserted into the track in the bearing outer ring 30, so that the roller bodies 12 are supported on the track of the bearing outer ring 30. A tilting of the roller bodies 12 during insertion can be reliably and advantageously prevented due to the inward pressing of the roller bodies 12 by the assembly jig.

During insertion, the projections 16 of the assembly jig are pushed into the bearing outer ring 30 in a manner of speaking, so that the projections 16 overlap with the track of the bearing outer ring 30 in a radial direction. Subsequently, the bearing inner ring 24 can be secured, e.g., by a snap ring or the like, and the assembly jig can be pulled out of the bearing outer ring 30 and out of the intervening spaces between the roller bodies 12.

Since the roller bodies 12 are retained by the retaining structure 10 of the assembly jig during the entire insertion movement into the bearing outer ring 30, a tilting of the roller bodies 12 during insertion into the bearing outer ring 30, and thus accompany damage to the tracks, can be reliably prevented.

REFERENCE NUMBER LIST

10 Retaining structure
12 Roller body
14 Roller body cage
16 Projection
18a Abutment surface
18b Abutment surface
20 Retaining ring
21 Abutment collar
22 Bow handle
24 Bearing inner ring
26 Chamfer
28 Bore
30 Bearing outer ring
32 Housing
R1 Direction
R2 Direction

The invention claimed is:

1. An assembly jig for a radial roller bearing, the assembly jig comprising:
   a retaining structure comprising a plurality of projections extending in an axial direction and being configured to retain a plurality of roller bodies disposed in a ring-shape during a bearing assembly process, wherein the projections are configured such that:
   the roller bodies are supportable in a first radial direction on a first component, each roller body contacts two adjacent projections in a second radial direction, which is opposite of the first radial direction, such that the projections press the roller bodies against the first component, wherein each projection comprises two concave abutment surfaces configured to abut one roller body on each side of the projection in the circumferential direction, a portion of the roller bodies projects past the projections in the second radial direction, at least one chamfer is formed on an axial terminal end of each of the projections, wherein the at least one chamfer is disposed such that it is located between one of the concave abutment surfaces and the axial terminal end of each of the projections, and wherein the assembly jig is configured to be removable from the roller bearing in the axial direction after final assembly of the roller bearing.

2. An assembly jig according to claim 1, wherein the first component is selected from a roller body cage and a track of a roller bearing ring.

3. An assembly jig according to claim 2, wherein the retaining structure comprises a retaining ring and the projections extend axially from one axial end side of the retaining ring.

4. An assembly jig according to claim 3, wherein the retaining ring comprises an abutment collar projecting in one of the first and second radial directions.

5. An assembly jig according to claim 4, wherein the retaining ring comprises means for manually manipulating the assembly jig.

6. An assembly jig according to claim 5, wherein the manually manipulating means comprises at least one bow handle.

7. An assembly jig according to claim 6, wherein the retaining structure is configured to retain one of cylindrical roller bodies and tapered roller bodies.

8. An assembly jig according to claim 1, wherein the retaining structure comprises a retaining ring and the projections extend axially from one axial end side of the retaining ring.

9. An assembly jig according to claim 8, wherein the retaining ring comprises an abutment collar projecting in one of the first and second radial directions.

10. An assembly jig according to claim 1, wherein the retaining structure comprises means for manually manipulating the assembly jig.

11. An assembly jig according to claim 1, further comprising at least one bow handle attached to the retaining structure on an axial side opposite of the projections, the at least one bow handle being configured to permit manual manipulation of the assembly jib.

12. An assembly jig according to claim 1, wherein the retaining structure is configured to retain one of cylindrical roller bodies and tapered roller bodies.

13. A method for assembling a radial bearing comprising:
mounting a first bearing ring on a shaft or in a housing,
retaining a plurality of roller bodies between an assembly jig of and a first component,
wherein the assembly jig comprises:

a retaining structure comprising a plurality of projections extending in an axial direction and being configured to retain a plurality of roller bodies disposed in a ring-shape during a bearing assembly process, wherein the projections are configured such that;

the roller bodies are supportable in a first radial direction on a first component, each roller body contacts two adjacent projections in a second radial direction, which is opposite of the first radial direction, such that the projections press the roller bodies against the first component, wherein each projection comprises two concave abutment surfaces configured to abut one roller body on each side of the projection in the circumferential direction, a portion of the roller bodies projects past the projections in the second radial direction, at least one chamfer is formed on an axial terminal end of each of the projections, wherein the at least one chamfer is disposed such that it is located between one of the concave abutment surfaces and the axial terminal end of each of the projections, wherein the assembly jig is configured to be removable from the roller bearing in the axial direction after final assembly of the roller bearing, and moving the assembly jig in an axial direction relative to the first bearing ring, so that the roller bodies are disposed concentrically to the first bearing ring, thereby forming the radial bearing, securing the roller bodies within the radial bearing, and withdrawing the assembly jig in the axial direction.

14. The method according to claim 13, wherein the first component is selected from a roller body cage and a second bearing ring.

15. The method according to claim 13, wherein the first component is a second bearing ring having a track with flanges configured to axially retain the roller bodies in a captive manner.

16. The method according to claim 15, wherein the first bearing ring is an outer bearing ring mounted in a housing, the second bearing ring is an inner bearing ring mountable on a shaft, and the assembly jig comprises a radially-inward extending abutment collar configured to abut on the shaft when the second bearing ring has reached its final assembled axial position within the first bearing ring.

17. The method according to claim 16, wherein each projection comprises two chamfers extending in a circumferential direction.

18. The method according to claim 17, wherein at least one handle is affixed to the retaining structure and the assembly jig is manually pushed into the first bearing ring.

* * * * *